United States Patent [19]

Powell

[11] Patent Number: 4,559,154

[45] Date of Patent: Dec. 17, 1985

[54] HEAT PUMPS

[75] Inventor: Richard L. Powell, Winsford, England

[73] Assignee: Imperial Chemical Industries PLC, London, England

[21] Appl. No.: 636,272

[22] Filed: Jul. 31, 1984

[30] Foreign Application Priority Data

Aug. 10, 1983 [GB] United Kingdom ............... 8321569

[51] Int. Cl.$^4$ ............................................. C09K 5/04
[52] U.S. Cl. ...................................... 252/69; 252/67; 568/683; 570/134
[58] Field of Search ................... 252/67, 69; 568/683; 570/134

[56] References Cited

U.S. PATENT DOCUMENTS

| | | | |
|---|---|---|---|
| 2,035,541 | 3/1936 | Fleischer | 252/69 |
| 3,362,180 | 1/1968 | Eiseman, Jr. | 252/67 |
| 3,689,459 | 9/1972 | Regan | 568/683 |
| 4,054,036 | 10/1977 | Murphy et al. | 252/67 |
| 4,104,314 | 8/1978 | Terrell | 568/683 |
| 4,454,052 | 6/1984 | Shoji et al. | 252/67 |
| 4,482,465 | 11/1984 | Gray | 252/67 |

OTHER PUBLICATIONS

Bokelmann et al.: "Investigation of Working Fluids for Gas-Fired Absorption Plants", 1983 International Gas Research Conference, Hilton International, London, Jun. 13-16, 1983, Report No. IGRC/C05-83.

*Primary Examiner*—A. Lionel Clingman
*Assistant Examiner*—Robert A. Wax
*Attorney, Agent, or Firm*—Cushman, Darby & Cushman

[57] ABSTRACT

An absorption heat pump system wherein the working fluid is a saturated fluorohydrocarbon or fluorohydrocarbon ether having from 3 to 5 carbon atoms.

2 Claims, No Drawings

HEAT PUMPS

This invention relates to heat pumps of the absorption type and more particularly to working fluids for use therein.

Heat pumps which transfer heat from a low temperature zone to a higher temperature zone are well known. In the absorption type of heat pump, a fluid of suitable boiling point evaporates at low pressure taking heat from the surrounding lower temperature zone. The resulting vapour then passes to an absorber where it is absorbed in a solvent having a higher boiling point than that of the fluid. The solution so formed is then passed to a boiler or generator where it is heated to drive off the fluid as vapour, the hot solvent being returned by way of a heat exchanger to the absorber. As the fluid evaporates, the pressure developed is sufficient to cause it to condense in a condenser and thereby release heat to the higher temperature zone. The condensate is then returned through an expansion valve to the evaporator to complete the cycle.

The suitability of a material as a heat pump working fluid depends upon a number of factors. Thus, in addition to having a suitable boiling point, it must be generally acceptable in respect of toxicity, flammability and corrosivity. In an absorption type heat pump system, the solvent must also be satisfactory in these respects. Ideally, the boiling point of the solvent is as high as possible to minimise vaporisation and loss of solvent from the generator along with the working fluid. It is also important, in order to minimise the mass flow of solvent between absorber and generator and thereby limit the size of the solution heat exchanger required, that the working fluid and solvent should interact in such a way that the solution of the one in the other exhibits a negative deviation from Raoult's law, both components of the solution exerting a lower vapour pressure than would be expected having regard to the vapour pressures of the pure components. This situation arises when an affinity or attraction exists between the molecules of the working fluid and the solvent molecules, an affinity which can often be interpreted in terms of hydrogen bonding.

Materials that have been used as working fluids in absorption type heat pumps include ammonia, the solvent then being water. Other fluids proposed include fluorinated hydrocarbons such as monochlorodifluoromethane, 1-chloro-2,2,2-trifluoroethane and 1,1,1,2-tetrafluoroethane. Solvents for use with these fluids include materials of a slightly basic nature capable of interacting with acidic hydrogen atoms present in the fluoro compounds. Whilst these fluids have been generally satisfactory for the purpose for which they were intended, they are less suitable for heat pumps operating at high output temperatures.

The present invention provides an absorption heat pump system wherein the working fluid is a saturated fluorohydrocarbon or fluorohydrocarbon ether having from 3 to 5 carbon atoms.

The term "fluorohydrocarbon" as used herein means a compound containing atoms of carbon, hydrogen and fluorine only, whilst "fluorohydrocarbon ether" means an ether containing atoms of carbon, hydrogen, fluorine and oxygen only, both hydrogen and fluorine being present in each case.

For increased stability, the fluorohydrocarbons and fluorohydrocarbon ethers should not contain groups from which hydrogen fluoride is likely to be eliminated during use. Examples of such groups include —CH$_2$CH$_2$F and —CH$_2$—CHF—CH$_2$—. Where low flammability is an important criterion, the hydrogen/fluorine atomic ratio should not exceed unity.

The fluorohydrocarbons and ethers may have acyclic (linear or branched) or cyclic structures.

Examples of acyclic fluorohydrocarbons which may be used include those having the following structures:
1. H(CF$_2$)$_n$H wherein n is 3, 4 or 5,
2. H(CF$_2$)$_n$CH$_2$F wherein n is 2 or 3,
3. CF$_3$(CF$_2$)$_n$CH$_2$F wherein n is 1, 2 or 3,
4. CF$_3$CHF(CF$_2$)$_n$CH$_2$F wherein n is 0, 1 or 2,
5. CF$_3$CHF(CF$_2$)$_n$CHF$_2$ wherein n is 0, 1 or 2.

The acyclic fluorohydrocarbons may be obtained by methods that have been fully described in the prior art.

Acyclic fluorohydrocarbon ethers which may be used include fluorinated dialkyl ethers having from 3 to 5 carbon atoms of which an alpha-carbon atom, relative to the oxygen atom, carries at least one fluorine substituent and the adjacent beta-carbon atom carries at least one hydrogen substituent. Ethers of this class may be prepared by the ionic addition of unsaturated fluorinated species to an alcohol. As examples of this class of ether, there may be mentioned 1-methoxy-1,1,2,2-tetrafluoroethane, 1-(2,2,2-trifluoroethoxy)-1,1,2,2-tetrafluoroethane and 1-methoxy-1,1,2-trifluoroethane.

Other acyclic hydrocarbon ethers which may be used include compounds of the formula:
6. ROCF$_2$H wherein R represents a fluorinated C$_{2-4}$ alkyl group. Ethers of this class may be prepared by the addition of difluorocarbene to a fluorinated alcohol. Examples include 1-difluoromethoxy-2,2,2-trifluoroethane.

Cyclic fluorohydrocarbons which may be used include three- to five-membered ring compounds. In particular, there may be mentioned compounds of the formula:

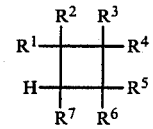

wherein at least four of the R$^1$–R$^7$ substituents represent fluorine, the remainder representing hydrogen. Examples of suitable cyclic fluorohydrocarbons include the following:

8. F$_2$ ▢ F$_2$ / F$_2$ ▢ FH

9. F$_2$ ▢ FH / F$_2$ ▢ FH  cis and trans

10. HF ▢ F$_2$ / F$_2$ ▢ FH  cis and trans

11. F$_2$ ▢ F$_2$ / H$_2$ ▢ F$_2$

12. H$_2$ ▢ FH / F$_2$ ▢ F$_2$

13. 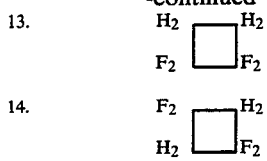

14.

Cyclic fluorohydrocarbon ethers which may be used include four- and five-membered ring compounds. In particular there may be mentioned fluorinated oxetanes having at least three fluorine substituents, for example 2,2,3,3-tetrafluoro-oxetane.

The cyclic fluorohydrocarbons and ethers may be obtained by known methods.

The fluoro compounds described herein have boiling points at atmospheric pressure in the temperature range 15°–75° C. and are especially suitable as working fluids in heat pumps of which the primary purpose is heating of the high temperature zone rather then refrigeration of the low temperature zone, for example pumps having output temperatures in the range 45°–80° C. and maximum working pressures in the range 1.5–10 bar.

The solvents to be used with the working fluids of the invention include those solvents already used or proposed for use with fluoro compounds in absorption heat pumps. The fluoro compounds described herein generally behave as proton donors and are advantageously used in combination with solvents having a proton acceptor capability. Such solvents include ethers such as tetraglyme, amides which may be lactams such as the N-alkylpyrrolidones, for example N-methylpyrrolidone, sulphonamides, for example tetraethylsulphamide and ureas including cyclic ureas of the formula:

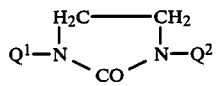

wherein each of $Q^1$ and $Q^2$, independently, represents hydrogen or a lower alkyl radical. An example of such a cyclic urea is 1,3-dimethyl-2-imidazolidinone.

The heat pump working fluids proposed herein may be used in conjunction with suitable solvents in absorption heat pumps of conventional design. The usefulness of a material as a heat pump working fluid is usually expressed as a coefficient of performance (COP) which is the ratio of quantity of heat extracted to amount of work expended.

In order to estimate the coefficient of performance for a fluid, the following data are required:
(i) the vapour pressure curve of the pure fluid;
(ii) the vapour pressure curve of the pure solvent;
(iii) the vapour pressure curves for a number of fluid/solvent solutions covering the upper and lower concentration limits to be found in the heat pump;
(iv) the molecular weight of the solvent;
(v) the vapour and liquid specific heats of the fluid over the temperature range to which it is to be exposed;
(vi) the liquid specific heat of the solvent, and
(vii) the liquid specific heats of the solvent/fluid solutions over the concentration range found in the pump.

The data required may be obtained experimentally and/or from published information.

The invention is illustrated but not limited by the following Examples:

EXAMPLE 1

An absorption heat pump can be constructed based on cis-1,2,3,3,4,4-hexafluorocyclobutane as the working fluid and 1,3-dimethyl-2-imidazolidinone (N N'-dimethylethylene urea) as the absorbing solvent.

The coefficient of performance of such a device will be 1.34 if the temperatures in the various components have the following values.
Evaporator: 0° C.;
Absorber: 40° C.;
Generator: 170° C.;
Condenser: 50° C.

This device will supply heat to circulating warm air central heating systems at 40°–45° C. For an output of 10 KW the mass flow rates of the solvent and fluid are:
Solvent 0.0713 Kg/sec around generator/solution heat exchanger/absorber system
Fluid 0.0287 Kg/sec around the generator/condenser evaporator/absorber/solution heat exchanger system.

EXAMPLE 2

An absorption heat pump can be constructed based on cis-1,2,3,3,4,4-hexafluorocyclobutane as the working fluid and tetraglyme as the absorbing solvent.

The coefficient of performance of such a device will be 1.31 if the temperatures in the various components have the following values:
Evaporator: 0° C.;
Absorber: 40° C.;
Generator: 170° C.;
Condenser: 50° C.

This device will be suitable for supplying heat to circulating warm air central heating systems at 40°–45° C. For an output of 10 KW the mass flow rates of the fluid and solvent are:

Solvent 0.0936 Kg/sec  } basis as for Example 1
Fluid 0.0257 Kg/sec

EXAMPLE 3

An absorption heat pump can be constructed based on 1-(2,2,2-trifluoroethoxy)-1,1,2,2-tetrafluoroethane as the working fluid and tetraglyme as the absorbing solvent.

The coefficient of performance will be 1.22 if the temperatures in the various components have the following values:
Evaporator: 0° C.;
Absorber: 40° C.;
Generator: 170° C.;
Condenser: 50° C.

This device will be suitable for supplying heat to circulating warm air central heating systems at 40°–45° C. For an output of 10 KW the mass flow rates of the fluid and solvent are:
Solvent: 0.140 Kg/sec;
Fluid: 0.0339 Kg/sec.

EXAMPLE 4

An absorption heat pump can be constructed based on 1,1,2,2,3-pentafluoropropane as the working fluid and 1,3-dimethyl-2-imidazolidinone as the absorbing solvent.

The coefficient of performance of such a device will be 1.46 if the temperatures in the various components have the following values.

Evaporator: 10° C.;
Absorber: 55° C.;
Generator: 200° C.;
Condenser: 65° C.

This device will supply heat to circulating warm water central heating systems at 55°–60° C. For an output of 10 KW the mass flow rates of the solvent and fluid are:

Solvent 0.031 Kg/sec around generator/solution heat exchanger/absorber system.
Fluid 0.063 Kg/sec around the generator/condenser evaporator/absorber/solution heat exchanger system.

EXAMPLE 5

An absorption heat pump can be constructed based on 1,1,2,2,3-pentafluoropropane as the working fluid and 1,3-dimethyl-2-imidazolidinone as the absorbing solvent.

The coefficient of performance of such a device will be 1.51 if the temperatures in the various components have the following values.

Evaporator: 0° C.;
Absorber: 40° C.;
Generator: 180° C.;
Condenser: 50° C.

This device will supply heat to circulating warm air central heating systems at 40°–45° C. For an output of 10 KW the mass flow rates of the solvent and fluid are:

Solvent 0.057 Kg/sec around generator/solution heat exchanger/absorber system.
Fluid 0.030 Kg/sec around the generator/condenser evaporator/absorber/solution heat exchanger system.

EXAMPLE 6

An absorption heat pump can be constructed based on 1,1,2,2,3-pentafluoropropane as the working fluid and 1,3-dimethyl-2-imidazolidinone as the absorbing solvent.

The coefficient of performance of such a device will be 1.40 if the temperatures in the various components have the following values.

Evaporator: 0° C.;
Absorber: 55° C.;
Generator: 190° C.;
Condenser: 65° C.

This device will supply heat to circulating warm water central heating systems at 55°–60° C. For an output of 10 KW the mass flow rates of the solvent and fluid are:

Solvent 0.120 Kg/sec around generator/solution heat exchanger/absorber system.
Fluid 0.030 Kg/sec around the generator/condenser evaporator/absorber/solution heat exchanger system.

EXAMPLE 7

An absorption heat pump can be constructed based on 1-(2,2,2-trifluoroethoxy)-1,1,2,2-tetrafluoroethane as the working fluid and tetraglyme as the absorbing solvent.

The coefficient of performance of such a device will be 1.4 if the temperatures in the various components have the following values.

Evaporator: 0° C.;
Absorber: 50° C.;
Generator: 180° C.;
Condenser: 60° C.

This device will supply heat to circulating warm air or warm water central heating systems at 50°–55° C. For an output of 10 KW the mass flow rates of the solvent and fluid are:

Solvent 0.266 Kg/sec around generator/solution heat exchanger/absorber system.
Fluid 0.031 Kg/sec around the generator/condenser evaporator/absorber/solution heat exchanger system.

EXAMPLE 8

An absorption heat pump can be constructed based on 1-(2,2,2-trifluoroethoxy)-1,1,2,2-tetrafluoroethane as the working fluid and tetraglyme as the absorbing solvent.

The coefficient of performance of such a device will be 1.25 if the temperatures in the various components have the following values.

Evaporator: 10° C.;
Absorber: 55° C.;
Generator: 190° C.;
Condenser: 65° C.

This device will supply heat to circulating warm water central heating systems at 55°–60° C. For an output of 10 KW the mass flow rates of the solvent and fluid are:

Solvent 0.173 Kg/sec around generator/solution heat exchanger/absorber system.
Fluid 0.033 Kg/sec around the generator/condenser evaporator/absorber/solution heat exchanger system.

EXAMPLE 9

An absorption heat pump can be constructed based on cis-1,2,3,3,4,4-hexafluorocyclobutane as the working fluid and 1,3-dimethyl-2-imidazolidinone as the absorbing solvent.

The coefficient of performance of such a device will be 1.26 if the temperatures in the various components have the following values.

Evaporator: 10° C.;
Absorber: 50° C.;
Generator: 180° C.;
Condenser: 60° C.

This device will supply heat to circulating warm water central heating systems at 50°–55° C. For an output of 10 KW the mass flow rates of the solvent and fluid are:

Solvent 0.076 Kg/sec around generator/solution heat exchanger/absorber system.
Fluid 0.029 Kg/sec around the generator/condenser evaporator/absorber/solution heat exchanger system.

EXAMPLE 10

An absorption heat pump can be constructed based on cis-1,2,3,3,4,4-hexafluorocyclobutane as the working fluid and tetraglyme as the absorbing solvent.

The coefficient of performance of such a device will be 1.36 if the temperatures in the various components have the following values.

Evaporator: 5° C.;
Absorber: 50° C.;
Generator: 180° C.;
Condenser: 60° C.

This device will supply heat to circulating warm water central heating systems at 50°–55° C. For an output of 10 KW the mass flow rates of the solvent and fluid are:

Solvent 0.133 Kg/sec around generator/solution heat exchanger/absorber system.

Fluid 0.026 Kg/sec around the generator/condenser evaporator/absorber/solution heat exchanger system.

EXAMPLE 11

An absorption heat pump can be constructed based on cis-1,2,3,3,4,4-hexafluorocyclobutane as the working fluid and tetraglyme as the absorbing solvent.

The coefficient of performance of such a device will be 1.36 if the temperatures in the various components have the following values.

Evaporator: 10° C.;
Absorber: 50° C.;
Generator: 200° C.;
Condenser: 60° C.

This device will supply heat to circulating warm air central heating systems at 50°–55° C. For an output of 10 KW the mass flow rates of the solvent and fluid are:

Solvent 0.116 Kg/sec around generator/solution heat exchanger/absorber system.

Fluid 0.027 Kg/sec around the generator/condenser evaporator/absorber/solution heat exchanger system.

I claim:

1. An absorption heat pump wherein the working fluid is a saturated fluorohydrocarbon or fluorohydrocarbon ether having from 3 to 5 carbon atoms and the solvent is a compound of the formula:

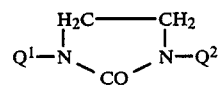

wherein each of $Q^1$ and $Q^2$, independently, represents hydrogen or a $C_{1-4}$ alkyl radical.

2. An absorption heat pump according to claim 1 in which each of $Q^1$ and $Q^2$ is methyl.

* * * * *